United States Patent [19]
Brady et al.

[11] Patent Number: 5,630,059
[45] Date of Patent: May 13, 1997

[54] EXPEDITED MESSAGE TRANSFER IN A MULTI-NODAL DATA PROCESSING SYSTEM

[75] Inventors: James T. Brady; Damon W. Finney, both of San Jose; David R. Nowlen, Morgan Hill, all of Calif.

[73] Assignee: International Business Machines Corporation, Armonk, N.Y.

[21] Appl. No.: 383,962

[22] Filed: Feb. 6, 1995

[51] Int. Cl.$^6$ ................................................. G06F 13/00
[52] U.S. Cl. .................. 395/200.01; 395/853; 395/821; 395/733; 395/846
[58] Field of Search ................................. 395/825, 325, 395/425, 200, 821, 846, 853, 733

[56] References Cited

U.S. PATENT DOCUMENTS

| | | | |
|---|---|---|---|
| 4,504,901 | 3/1985 | Calvignac et al. | 395/200 |
| 4,785,396 | 11/1988 | Murphy et al. | 364/200 |
| 5,031,089 | 7/1991 | Liu et al. | 364/200 |
| 5,237,567 | 8/1993 | Nay et al. | 370/85.1 |
| 5,287,485 | 2/1994 | Umina et al. | 395/425 |
| 5,313,582 | 5/1994 | Hendel et al. | 395/250 |
| 5,313,594 | 5/1994 | Wakerly | 395/325 |
| 5,333,269 | 7/1994 | Calvignac et al. | 395/200 |
| 5,386,524 | 1/1995 | Lary et al. | 395/400 |
| 5,388,237 | 2/1995 | Sodos | 395/425 |
| 5,390,316 | 2/1995 | Cramer et al. | 395/425 |

Primary Examiner—Christopher B. Shin
Attorney, Agent, or Firm—Ohlandt, Greeley, Ruggiero & Perle

[57] ABSTRACT

A multi-nodal computing system is connected by a communication network. A first node of the multi-nodal system includes apparatus for transmitting an information transfer request to a second node, the request including identification data that the second node can use to access the selected information. The second node includes memory for storing the requested information and a message output control structure. A processor is responsive to received identification data from the first node to access selected information that is defined by the data. The processor is further responsive to the information transfer request to insert the identification data received from the first node directly into a message output control structure. The processor then initiates an output operation by employing the identification data in the message output control data structure to access the identified information and to communicate the information to the first node. In such manner, no processor interrupt is required (with software intervention) to enable the requested information to be transferred, as pointers to that information are already included in the message output control structure, with the output mechanism in the second node employing that output control structure to access and transmit the requested information.

8 Claims, 7 Drawing Sheets

EXPEDITED MESSAGE TRANSFER IN A MULTI-NODAL DATA PROCESSING SYSTEM

FIELD OF THE INVENTION

This invention relates to data transmission procedures in a multi-nodal network and, more particularly, to a method and apparatus for enabling a data-receiving node to request specific data from a data source node in such a manner that the data source node is immediately enabled to transfer the requested data, without software intervention.

BACKGROUND OF THE INVENTION

Substantial development efforts are being directed towards the creation of multi-nodal data processing systems wherein each node includes an independent micro-processor and plural nodes operate in parallel to perform a data processing action. Not only do multi-nodal systems configure parallel processor systems, but a multi-nodal architecture is being used to configure large direct access storage device (DASD) arrays.

To assure operability of such a multi-nodal array, system architectures assure that overall control is distributed amongst the nodes so that no single failure of a node will cause the system to "crash". Of necessity, such an architecture requires large amounts of data communications between nodes. Unless such data transmissions are handled in a manner to assure the most rapid of data transfers, the communication overhead can substantially reduce the effectiveness of a multi-nodal architecture.

In copending U.S. Patent application Ser. No. 08/241,904 to Brady et al., assigned to the same assignee as this application, a technique is described for enabling high speed pipelining of data between nodes in a multi-nodal system. The Brady et al. system assures that data is outputted from a buffer in the data-source node before the buffer is entirely filled. Software control mechanisms are only enabled when the amount of data stored in the buffer reaches a low level—at which time updating of software control mechanisms is allowed to occur. By avoiding unnecessary updating actions, data transfer rates are enhanced.

A common technique for control of data transfers between nodes is to have a source node transfer a message to a destination node that data will be forthcoming. In response, the destination node executes a processor interrupt to enable necessary logical control structures to be created to handle the expected data. By contrast, there are times when a destination node requires data to perform a data processing action. In such circumstance, the prior art has caused the destination node to send a request for data to the source node. Upon receiving a request, the source node executes an interrupt, identifies and accesses the required data and transmits it to the destination node. The interrupt at the source node may be placed on an interrupt queue causing a delay until the node's processor removes the interrupt for execution. Further, before a processor executes a data transmission action, logical structures are established, under software control, to receive the necessary control information and data to enable execution of the transfer. Such software intervention is time consuming and further slows the data transfer action.

A data transfer from a source node to a destination node, at the instigation of the source node, will hereafter be referred to as a "push". A data transfer from a source node in response to a request from a destination node will hereafter be referred to as a "pull".

It is an object of this invention to provide a multi-nodal data processing structure with an improved data transfer mechanism.

It is another object of this invention to provide a multi-nodal network wherein a pull can be executed by a data-containing node without software intervention.

It is yet another object of this invention to provide a multi-nodal network with a control mechanism in each node which enables pull data transfers to be executed using already-existing data structures.

SUMMARY OF THE INVENTION

A multi-nodal computing system is connected by a communication network. A first node of the multi-nodal system includes apparatus for transmitting an information transfer request to a second node, the request including identification data that the second node can use to access the selected information. The second node includes memory for storing the requested information and a message output control structure. A processor is responsive to received identification data from the first node to access selected information that is defined by the data. The processor is further responsive to the information transfer request to insert the identification data received from the first node directly into a message output control structure. The processor then initiates an output operation by employing the identification data in the message output control data structure to access the identified information and to communicate the information to the first node. In such manner, no processor interrupt is required (with software intervention) to enable the requested information to be transferred (as pointers to that information are already included in the message output control structure, with the output mechanism in the second node employing that output control structure to access and transmit the requested information.

DETAILED DESCRIPTION OF THE INVENTION

Pull Message Transfer Procedure

Figure 1:
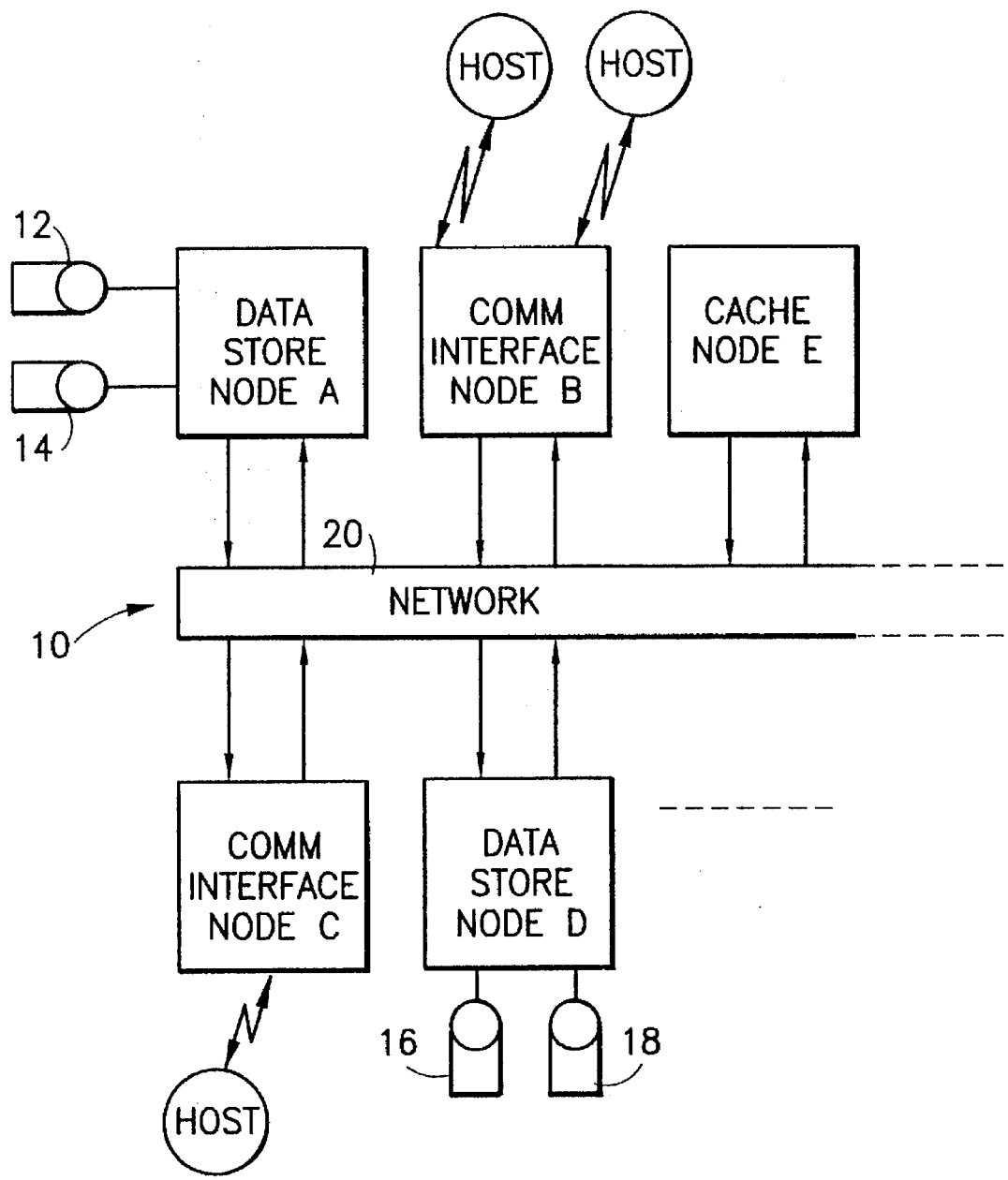
FIG. 1 is a block diagram illustrating a nodal disk array for a host processor.

Hereafter, the invention will be described in the context of a multi-nodal system wherein each node includes a data storage capability and/or a data communication interface capability. The multi-nodal system communicates with external host processors and provides a central, distributed data storage facility. Each node in the multi-node system includes multiple logical input ports and multiple logical output ports. Message control between nodes is exerted by nodal, hardware-based, input and output port structures.

A pull message transfer is a mode of data transfer between nodes in which the transfer is initiated by a node which is either to receive the data or which wishes the data to be transferred to another node (i.e., a destination node). This action is in contrast with a push message transfer where the transmission is initiated by a node which already possesses the data (i.e., a source node). A pull may only be used when the requesting node knows where the data is stored that it wants to receive (or be directed elsewhere). For example, a first node can pull records from a buffer in a second node in response to read commands if the first node knows in which second node the data is stored. Hereafter, the node which requests a data transfer will be termed the "pulling" node and the node which presently stores the data and is to send the data in response to a pull request will be referred to as the "pulled" node. Furthermore, it will hereafter be assumed that the pulling node is the destination node (even though any other node can be designated as the destination node by the pulling node).

Both pulling and pulled nodes must establish logical data structure in advance of an actual transmission of a message containing the requested data. Those message structures, to be described in detail below, enable each node to segregate incoming message data and to prepare to execute a requested action. When a pulling node transmits a pull request to a pulled node for certain data stored in the pulled node, the pulled node sets up data structures to receive data from the incoming message. The pulled node also establishes output data structures to receive the requested data when it is accessed from the pulled node's buffer store. However, in lieu of executing an interrupt to implement the data transfer, the pulled node inserts a portion of the received pull message, as is, into an output-controlling data structure so that upon receipt of the entire pull message, all information necessary to enable transmission of the requested data is already present in the output data structure. No software-controlled microprocessor intervention is required.

The pulled node next executes its output function by accessing the output control data structures. Since an output data control structure already includes the necessary information to access the requested data, that data is automatically addressed and prepared for transmission by insertion of its identifier into an output queue. Put more simply, the pull protocol is akin to the pulling node sending the pulled node a self-addressed stamped envelope with an identifier of the data the pulled node wishes inserted into the envelope. The pulled node employs the stamped, self-addressed envelope to access the requested data and to transmit it to the pulling node.

Hereafter, the nodal array and node structures will be described with reference to FIGS. 1 and 2. The hardware and software control data structures required to implement the invention will be described with reference to FIGS. 3a–3d and the overall operation of the hardware and software to implement the pull message transfer protocol will be described in relation to FIG. 4.

Nodal Array and Node Structures

FIG. 1 illustrates a disk drive array 10 configured, for example, as a multi-node network. Nodes A and D are data storage nodes that connect to coupled disk drives 12, 14 and 16, 18, respectively. While only four disk drives are shown, one skilled in the art will realize that disk drive array 10 can include many more disk drives. A pair of communication interface nodes B and C provide input/output communication functions for disk drive array 10. Host processors are coupled to nodes B and C via communication links. Disk drive array 10 further includes a cache node E which provides a temporary storage facility for both input and output message transfers. Disk drive array 10 is expandable by addition of further nodes, all of which are interconnected by a communication network 20.

Figure 2:
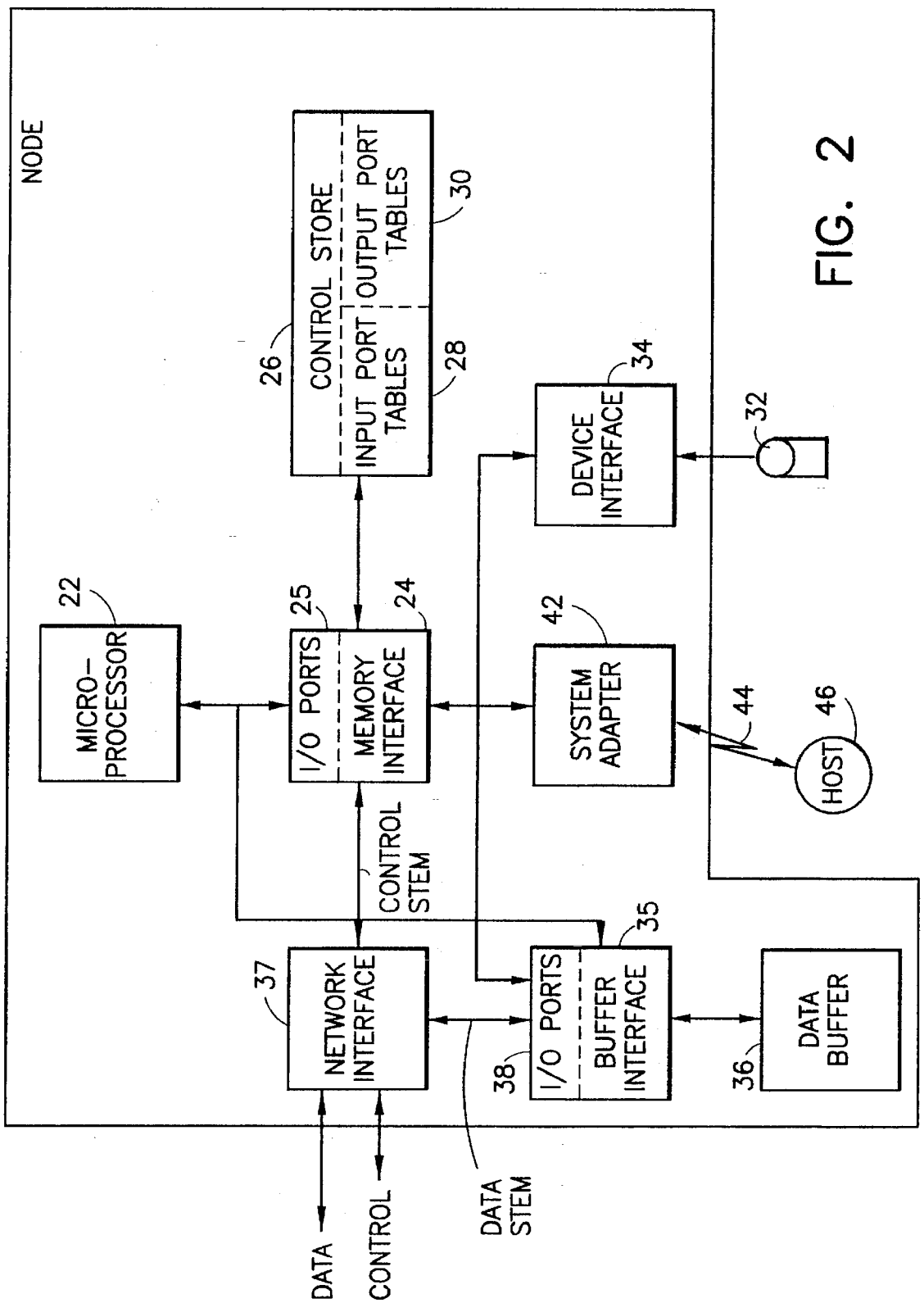
FIG. 2 is a block diagram of an exemplary node employed in the system of FIG. 1.

Each of nodes A–E in FIG. 1 is configured in a standard node arrangement shown in FIG. 2. A node includes a microprocessor 22 that controls the overall functions of the node. A memory interface module 24 controls communications between microprocessor 22 and plural memory modules within the node. Memory interface module 24 also includes input/output hardware 25 for handling of control messages. Control messages are stored in a connected control store 26 which also contains code that controls the operation of microprocessor 22. Among other control code contained within control store 26 is an input port table 28 and an output port table 30. As will become apparent from the description below, a node includes many logical input/output ports. An input port table 28 and an output port table 30 are provided for each physical input/output port. Entries in those tables correspond to the logical input/output ports.

The node of FIG. 2 includes plural disk drives 32 (only one is shown) that are connected via device interfaces 34 to memory interface 24 and a data buffer interface 35. Data buffer interface 35 connects a data buffer 36 to a network interface 37. Data buffer 36 provides buffering functions for both incoming and outgoing data messages (as contrasted to control messages). Buffer interface 35 further includes input/output hardware ports 38 for handling of received data. Input/output hardware ports 38 in buffer interface 35 and input/output hardware ports 25 in memory interface 24 are controlled by entries in input port tables 28 and output port tables 30 in control store 26. Network interface 37 provides interface functions for both incoming and outgoing message transfers.

Operations within the node of FIG. 2 are controlled by software-generated control blocks. For any read or write action, plural control blocks are assigned by software working in conjunction with microprocessor 22 to enable setup of the hardware within the node in accordance with a required action. For any single read or write, the software assigns plural control blocks. Each control block includes at least one parameter required to enable a setup action by the hardware that is required during the read or write.

Control block data structures enable the node of FIG. 2 to assemble a message that is to be transmitted to either another node, to a disk drive or to a host processor. The message may be assembled through use of plural control blocks that are "chained" so that one control block includes a pointer to a next control block. Control blocks further indicate a data processing action to occur that will enable assembly of data for a message, where the data is to be found, a designation of its structure, identification of buffer storage for holding the data comprising the message (pending dispatch), and further data which identifies where the data is to be dispatched. The invention makes use of input control blocks (ICBs) and output control blocks (OCBs). Each ICB and OCB respectively comprise a message. OCBs may be "chained" and as such, define a series of messages that have a sequence dependency that tracks the sequence of the chained blocks.

Software Control Block Data Structures

To better understand the invention, a description will hereafter be provided of the control data structures that are employed in the node of FIG. 2. In FIGS. 3a–3d, combined hardware/software block diagrams illustrate control block data structures which enable both data messages and control messages to be dispatched and received.

Figure 3A:
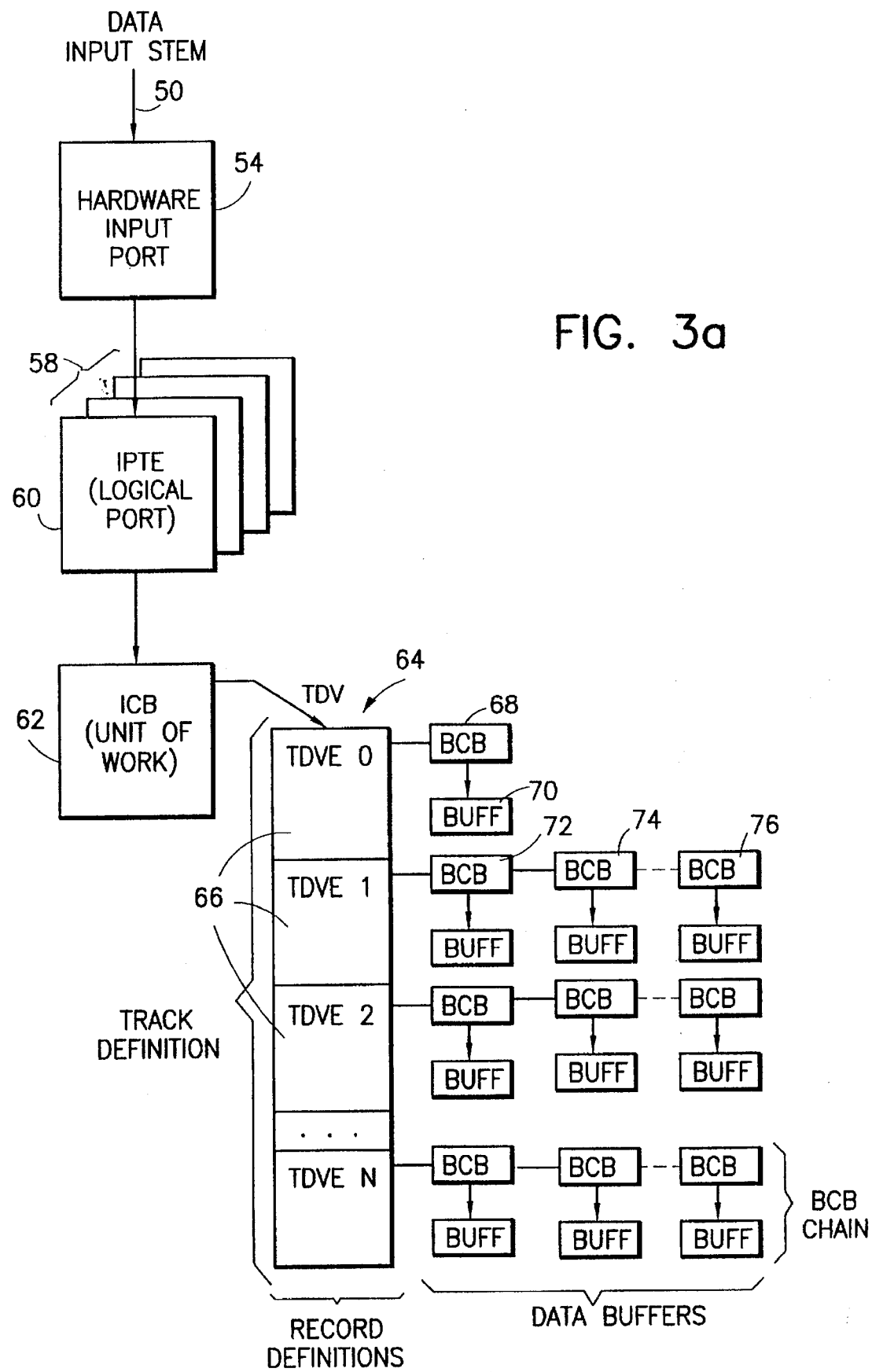
FIG. 3a is a diagram showing hardware and software control blocks that enable data messages to be received and stored.
Figure 3B:
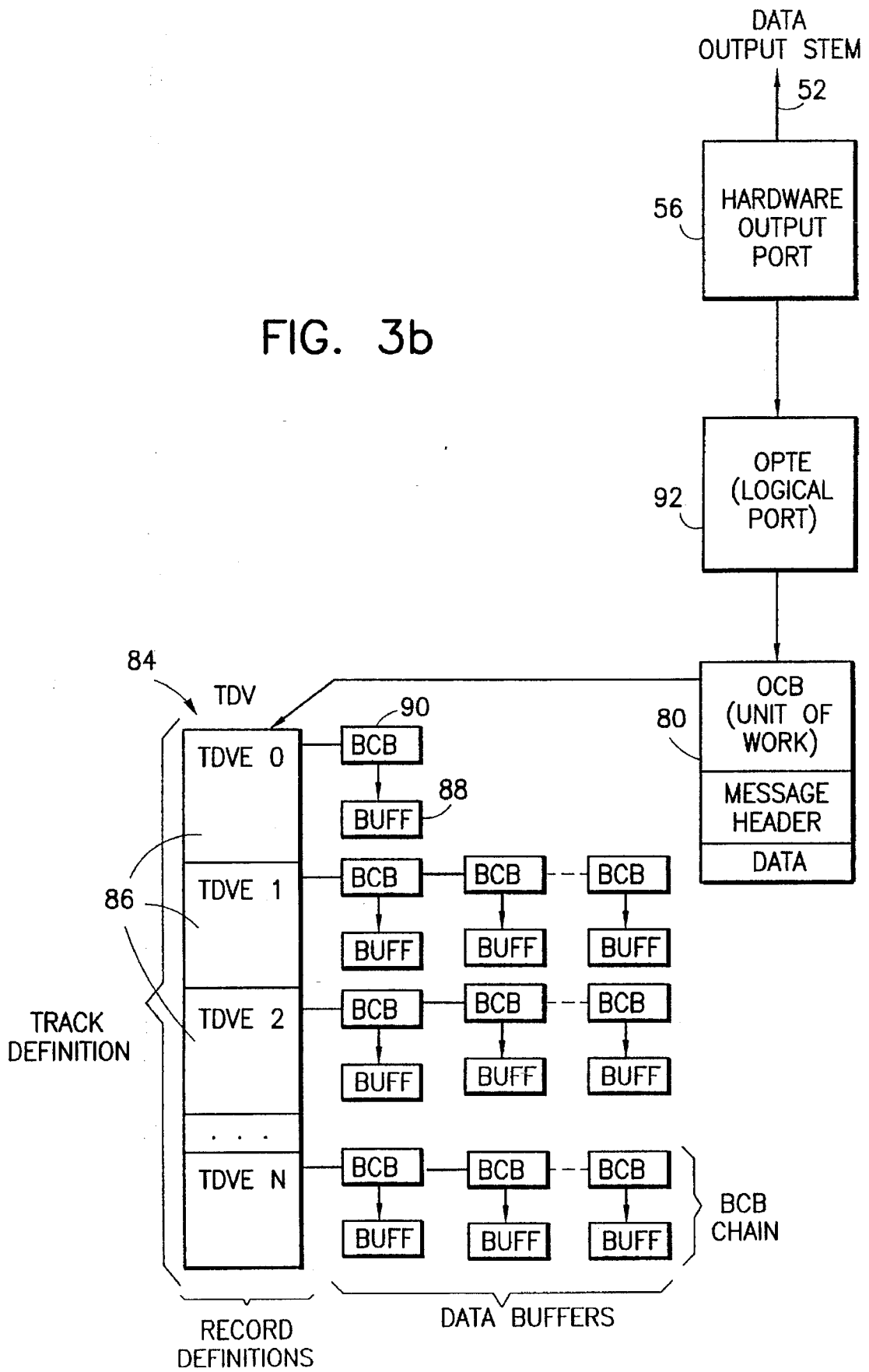
FIG. 3b is a diagram showing hardware and software control blocks that enable data messages to be compiled and transmitted.
Figure 3D:
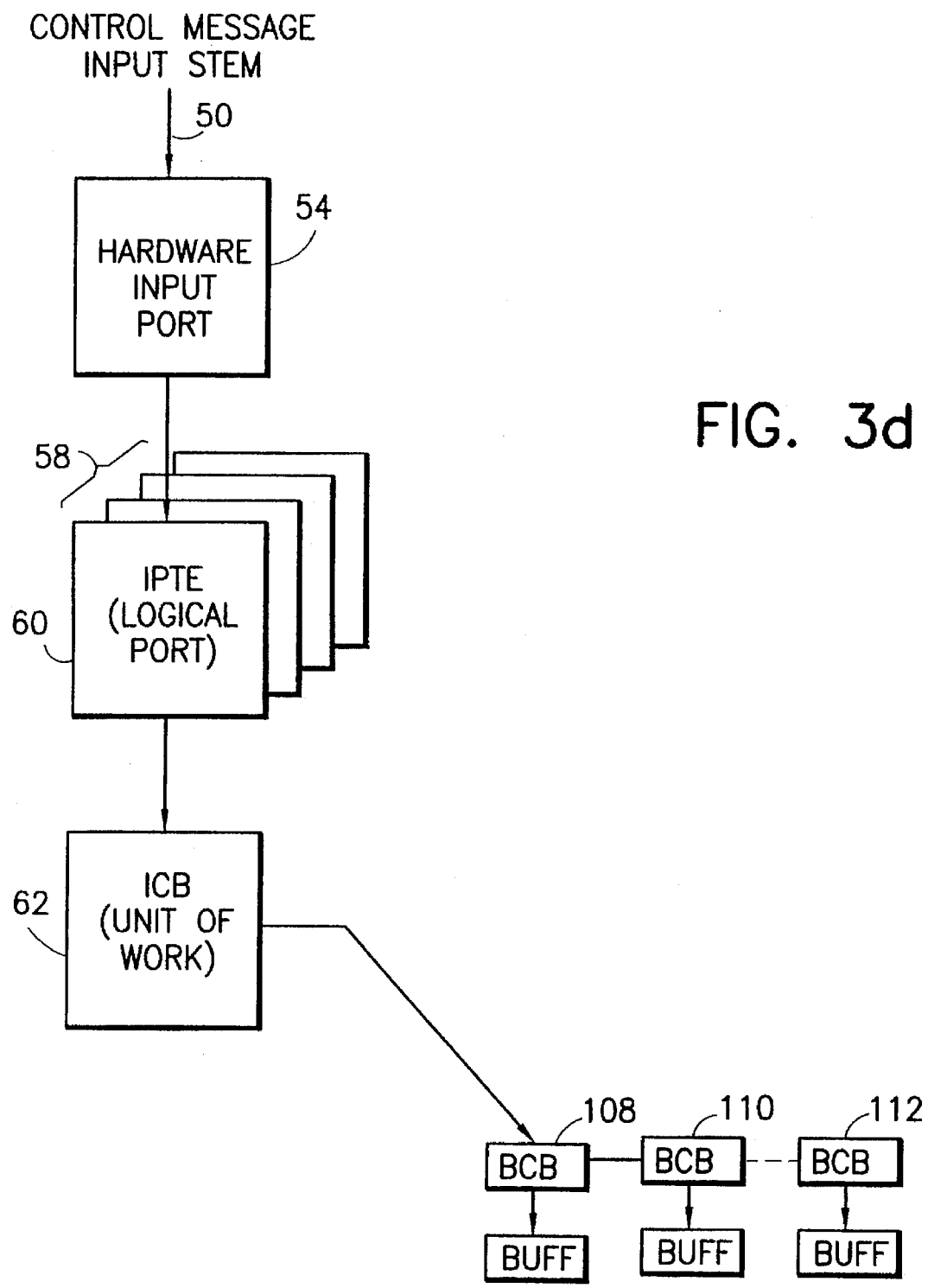
FIG. 3d is a diagram showing hardware and software control blocks that enable control messages to be received and stored.
Figure 3C:
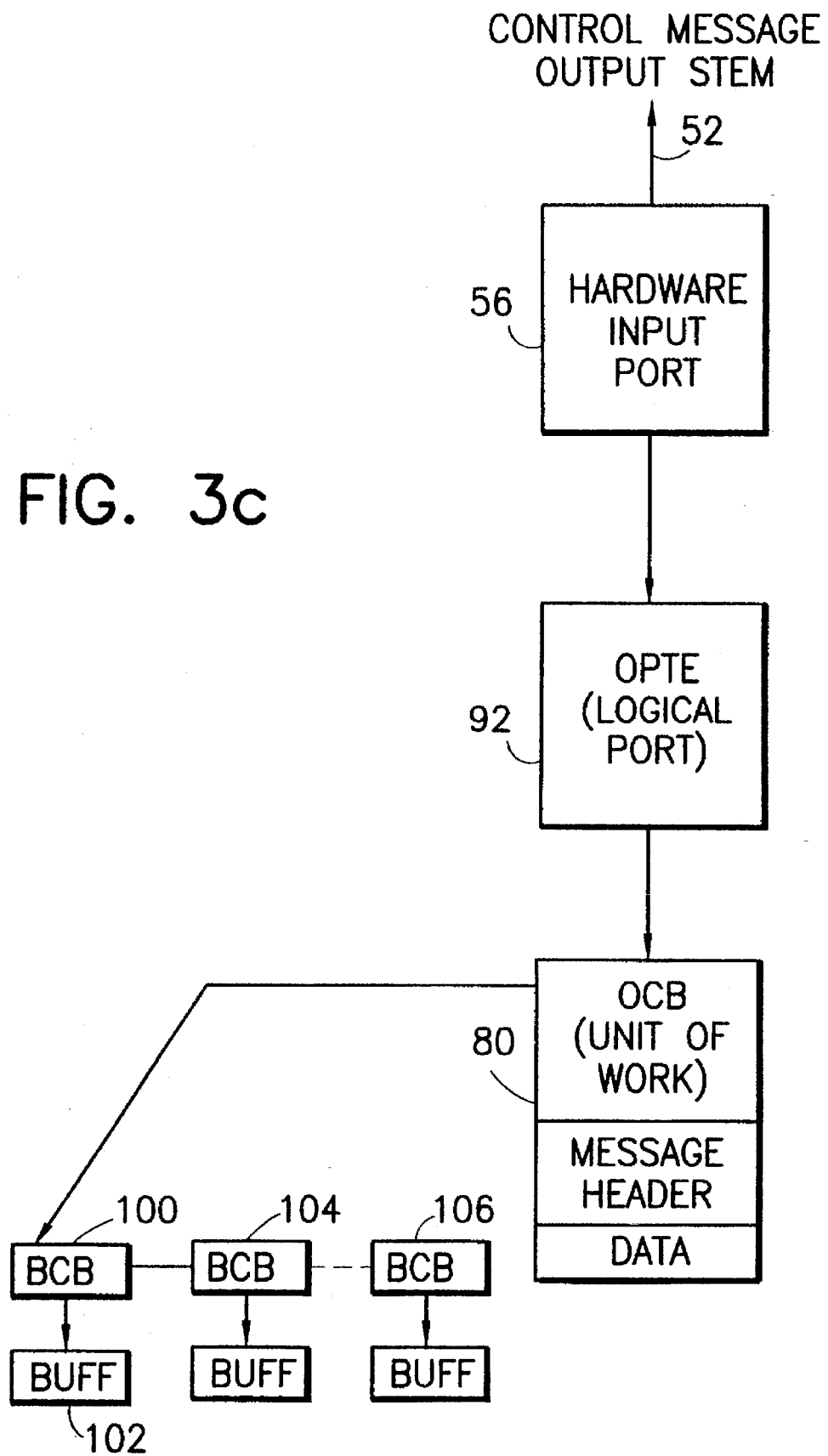
FIG. 3c is a diagram showing hardware and software control blocks that enable control messages to be compiled and transmitted.
Figure 4:
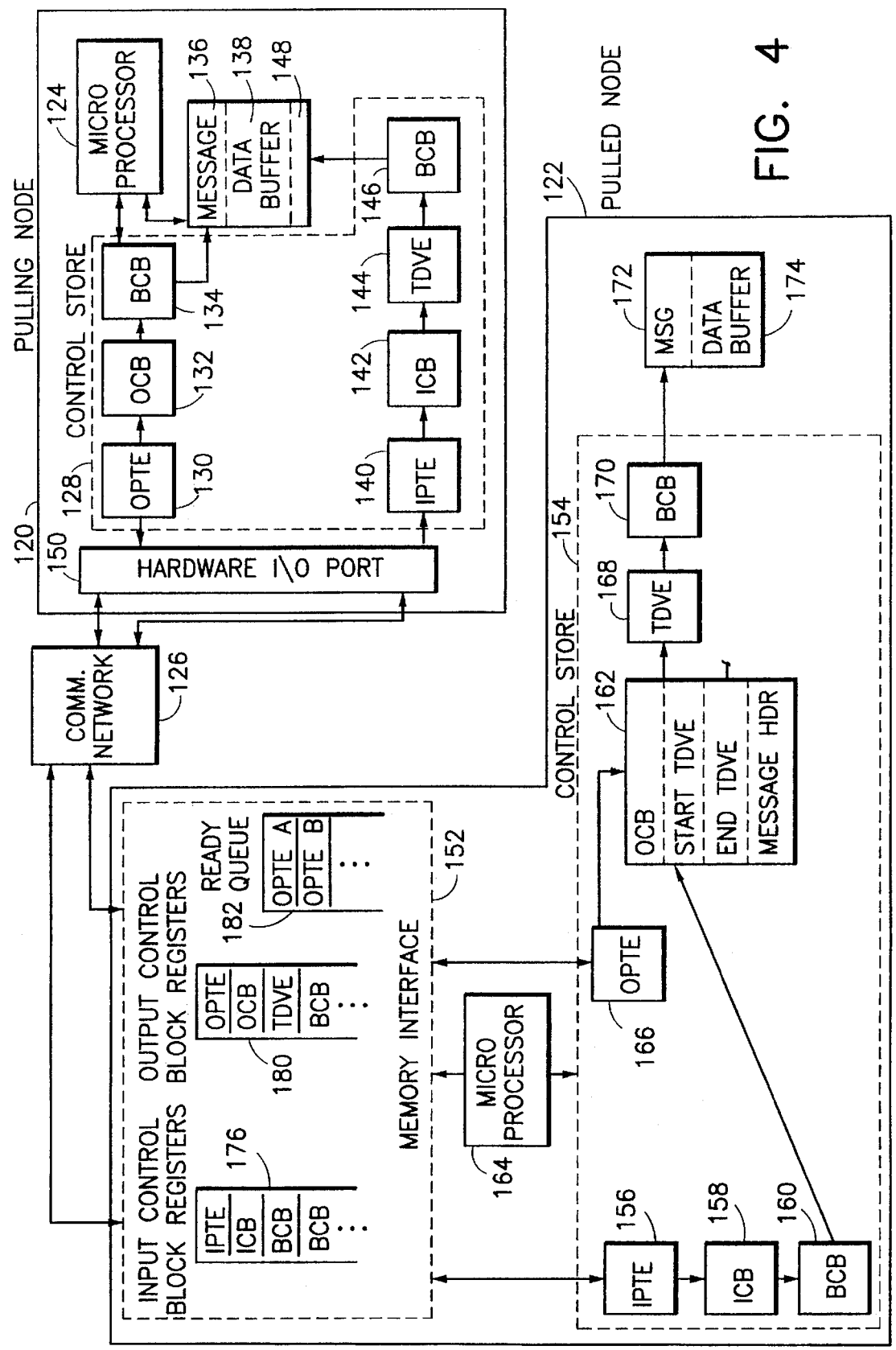
FIG. 4 is a combined hardware/software block diagram which illustrates the operation of a pair of nodes in carrying out the invention hereof.

Referring to FIGS. 3a and 3b, each node includes an input stem 50 and an output stem 52 that, respectively, handle incoming data messages and outgoing data messages. FIGS. 3c and 3d illustrate output and input stems, respectively, for control messages.

Input stem 50 (FIG. 3a) includes a hardware input port 54 which is matched by an equivalent hardware output port 56 (see FIG. 3b) in output stem 52. Hardware input port 54 is a physical entity in buffer interface 34 (see FIG. 2) that is used to manage processing and storage of in-bound data messages to a node. Hardware input port 54 and hardware output port 56 both have a set of associated hardware registers (not shown) which receive control data from control block data structures to be hereafter described. When all of the requisite control data is inserted into the hardware input/output port registers, a particular data processing action can then be accomplished (e.g., a message assembly and transmission)—using the control data present in the registers.

Hardware input port 54 is associated with an input port table 58 that lists the many logical input ports assigned to hardware input port 54. Each logical port is defined by an input port table entry (IPTE) 60, a portion of whose data structure is shown in Table 1 below.

INPUT PORT TABLE ENTRY (IPTE)

FIRST ICB
LAST ICB
FLAGS
POINTER TO OUTPUT HARDWARE PORT
POINTER TO OUTPUT LOGICAL PORT

TABLE 1

An IPTE 60 includes a designation of a first input control block (ICB) required to commence a data processing action (e.g., a message store action), and a designation of the last input control block (ICB) that terminates the data processing action. Intermediate ICBs are determined by chaining values contained within the individual control blocks. ICBs also describe a data processing function and enable location of data to be subjected to the data processing action.

An IPTE 60 further includes: flags which define interrupt conditions, status states, response states, etc. and pointers to both output hardware port 56 and a logical output port. Those skilled in the art will realize that control messages received at a destination node prior to a data message's reception enable the node to set up the various entries in IPTE 60 and all ICBs that are chained therefrom.

When an input data message is received by hardware input port 54, depending upon the required data processing action, a series of ICBs 62 (FIG. 3a) are assigned by the software to enable the execution of the required action. The data structure of relevant portions of an ICB is shown in Table 2 below.

INPUT CONTROL BLOCK (ICB)

NEXT ICB POINTER
FLAGS
SECTOR LENGTH
SECTOR COUNT
START TDVE
END TDVE
TDV/BCB POINTER

TABLE 2

Each ICB 62 includes a next ICB pointer which is an address value of a next ICB data structure. It is the next ICB pointer value which accomplishes a chaining action between ICBs. The pointer to the first ICB, as above indicated, is contained in an IPTE 60. When the first ICB is accessed through use of that pointer, all ICBs associated with the data processing action can be determined by succeeding ICB pointers that are included in ICBs that are chained. An ICB defines, by virtue of various flags contained within it, a particular input-related data processing action to be performed.

An ICB further includes information that enables location of data within a disk drive track, i.e. sector length, sector count and a track descriptor vector (TDV) pointer. A TDV 64 is a table which includes entries that define a logical disk track that may comprise plural physical disk tracks. TDV 64 includes one or more track descriptor vector elements (TDVEs) 66. Each TDVE 66 is a control block which describes a physical disk record's format on a disk drive.

In addition to a start TDVE pointer, an ICB also includes an end TDVE pointer so that all records required for the ICB action are identified by data within or accessible from the ICB. Further control data is present in an ICB, but is not relevant to the invention described herein.

As above indicated, each ICB includes a pointer to a start TDVE 66. The TDVE data structure is illustrated in Table 3 below and contains a description of a record on a track.

TRACK DESCRIPTOR VECTOR ELEMENT (TDVE)

FIELD 1 DATA ID (e.g. COUNT)
FIELD 2 LENGTH (e.g. KEY)
FIELD 3 LENGTH (e.g. DATA)
FLAGS
FIRST BCB
RECORD NUMBER

TABLE 3

Assuming that records on a disk track are arranged using the known "Count, Key, Data" structure, a TDVE will include field descriptors for each of the Count, Key and Data fields. The Count key field will include the record count number that occurs in field 1 of the record; the field 2 value will include the length of the record name (i.e, the Key); and the field 3 value will indicate the length of data in the Data portion of the disk record.

As with other control blocks (remembering that each TDVE 66 is a control block), flags are included in a TDVE 66 which define interrupt states, control states, etc. A TDVE 66 further include a pointer to a first buffer control block (BCB) 68. A BCB 68 includes control data to enable set up and assignment of physical buffer space to be employed during a data write action (for example) and enables accomplishment of the individual actions needed to assemble a received message for writing to disk. As will be hereafter apparent, BCBs may also be chained.

As stated above, each TDVE 66 includes a pointer to a first buffer control block (BCB) 68 that defines what portion of memory should be allocated as a buffer for a write action (for example). A BCB 68 data structure is shown in Table 4 below.

BUFFER CONTROL BLOCK

NEXT BCB POINTER
DATA BYTES IN BUFFER
BUFFER SIZE
FLAGS
BUFFER ADDRESS

TABLE 4

A BCB 68 data structure commences with a pointer to a next BCB, it being realized that plural buffer locations may be allocated to a data write/data read operation. Referring back to FIG. 3a, assume that an ICB 62 includes a pointer to TDV 64, with TDVE 0 defining a first record required to accomplish a data write action. Recall that ICB 62 includes both a start TDVE pointer and an end TDVE pointer which, in the case shown in FIG. 3a, is TDVE N. Each TDVE 66 further includes a pointer to a BCB that defines an amount of buffer space (e.g. buffer 70) required to store the data record. Other TDVEs may include a pointer to plural chained BCBs 72, 74, 76, which define additional buffer areas within memory to be allocated.

Returning to Table 4, each BCB data structure includes a next BCB pointer (enables a chaining of BCBs). A next value in a BCB data structure defines the number of data bytes stored in the physical buffer space. Each BCB data structure further includes a designation of the required buffer size, flags for various control functions and the address of the first buffer address in the buffer memory.

Two additional control block structures are employed in an output stem to enable dispatch of messages. As shown in FIG. 3b, those control block structures are output control blocks (OCBs) 80 and output port table entries (OPTEs) 82. OCB and OPTE control block data structures are illustrated in Tables 5 and 6 and enable each unit of data accessed from disk to be provided to hardware output port 56 in output stem 52 (FIG. 3b).

OUTPUT CONTROL BLOCK (OCB)

NEXT OCB POINTER
START TDVE
END TDVE
FLAGS
DESTINATION ADDRESS
LOGICAL INPUT PORT ADDRESS AT DEST.
MESSAGE DATA
TDV/BCB

TABLE 5

An OCB 80 data structure (Table 5 and FIG. 3b) includes a pointer to a next OCB. It also includes a pointer to TDV table 84, a start TDVE pointer and an end TDVE pointer. Those pointers, in combination, enable identification of all TDVEs 86 which define data stored in various buffers 88 to be accessed (via pointers to BCBs 90 contained in each pointed-to TDVE and intermediate TDVEs). It will be hereafter understood that the invention enables an incoming pull message to include both START TDVE and END TDVE values for data to be transmitted from the pulled node to the pulling node. Those values are directly inserted into an OCB to enable, during an output dispatch action, for the OCB to directly access the required output data without software intervention.

An OCB 80 further includes a destination address for the data and a logical input port address at the destination where the data is to be directed. An OCB 80 may also include control message data to enable control information to be transmitted to a destination address.

OUTPUT PORT TABLE ENTRY (OPTE)

START OF OCB CHAIN
END OF OCB CHAIN
FLAGS
NEXT OPTE
INPUT PHYSICAL PORT
INPUT LOGICAL PORT

TABLE 6

Table 6 illustrates an OPTE 92 data structure which is substantially similar to an IPTE 60 but with reference to OCBs 80 that are to provide outgoing data. An OPTE 92 includes a pointer to a start of an OCB chain and a pointer to the end of the OCB chain. Flags are included which define interrupt states and other control functions. An OPTE 92 also includes a pointer to a next OPTE 92 so as to enable a chained series of OPTEs to be fed to the output via the ready queue. Pointers are also included to the input physical port and the input logical port and are used for functions unrelated to this invention.

The above description has considered control block data structures needed to accomplish data message transfers. As shown in FIGS. 3c and 3d, similar control blocks are used to enable dispatch and receipt of control messages. However, due the relative simplicity of control messages, the use of a TDV table (and its TDVEs) is unnecessary. As a result, in a control message source node (FIG. 3c), an OCB 80 includes a pointer to a BCB 100 that defines a first portion of a control message that is stored in buffer 102. Additional BCBs 104, 106, etc. may be chained from BCB 100. Similarly, in a control message destination node (FIG. 3d), an ICB 62 includes a pointer directly to a BCB 108, and indirectly to chained BCBs 110 and 112. These control block structures enable a control message to be assembled in a source node and to be received and stored in buffer in a destination node.

Pull Message Assembly

Employing the above-described control block structures (see FIG. 4), assembly and transmission of a pull request message will be described as between a pulling node 120 and a pulled node 122. At such time, a microprocessor 124 in pulling node 120 commences assembly of control blocks which will enable a pull request message to be dispatched, via communication network 126, to pulled node 122. Microprocessor 124, in combination with controlling software, establishes in control store 128 control block data structures which will enable the dispatch of the pull request message. An OPTE control block 130 is established which includes a pointer to OCB 132 which, in turn, contains a pointer to BCB 134. BCB 134 defines an area 136 within data buffer 138 which contains the actual pull message.

The pull message is of a special variety and includes data which specifically defines the data to be pulled from pulled node 122. The message is made up of a Start TDVE field, an End TDVE field and a Message Header field which tells pulled node 122 how to route the data that is identified by the values in the Start and End TDVE fields. It is this "pull" message which is equivalent to the self-addressed, stamped envelope in the analogy discussed above. The Start and End TDVE values identify the span of data that is to be put into the "envelope". Recall that the pulling node can request that the span of data be sent to itself or to another node (in which case the "envelope" is not "self-addressed"—but is addressed to the "another node").

At the same time that microprocessor 124 sets up the above-described output control block structures, input control block structures are also established to enable handling of the pulled data when it is received from pulled node 122. Those input control block structures include an IPTE control block 140, an ICB 142, a TDVE 144 and one or more chained BCBs 146. Pointers included in each of the control blocks, enable identification of an area 148 in data buffer 138 that is to receive the pulled message.

After each control block structure has been created in pulling node 120, registers within hardware I/O port 150 contain information required to locate OPTE and IPTE values that enable outgoing and incoming data, respectively, to be handled in accordance with the control block structures.

When a message is to be transmitted, microprocessor 124 causes an appropriate signal to be transmitted to hardware I/O port 150 which causes a sequential read-out of OPTE values and transmission of identified message data (via pointers to BCBs). In such a manner, pulling node 120 transmits the pull request, via communication network 126, to memory interface 152 in pulled node 122.

Prior to arrival of the pull request, other control messages have been transmitted from pulling node 120 to pulled node 122 which enable the establishment of control block structures to enable the handling of the incoming pull request message. Memory interface 152 includes a series of input control block registers which contain data from the input control blocks to enable necessary circuit connections to be established to respond to the pull request. Thus, prior to arrival of the pull message, pulled node 122 has already established in control store 154, a chain of input control blocks (IPTE 156, ICB 158 and BCB 160) which will be employed to direct the incoming message data to an appropriate storage location. However, in lieu of pointing to any available area within a local buffer store to store the incoming message, BCB 160 includes a pointer to an address in the local buffer store wherein OCB 162 is stored. OCB 162 has been established to be used during transmission of the data requested by the pull request. In similar manner, microprocessor 164 has also established an OPTE 166, a TDVE 168 and a BCB 170 to enable identification and access to a region 172 within data buffer 174 which contains requested message data.

When the pull message arrives at pulled node 122, it is handled in accord with control block data stored in input control block register 176 (i.e., IPTE 156, ICB 158 and BCB 160). Within ICB 158 are parameters that identify that OPTE 166 is to be dispatched to transmit the data requested by the pull message. ICB 158 also includes a pointer to BCB 160, with BCB 160 including a pointer which specifies the location in memory in which the pull request message is to be stored. As above indicated, the message portion of a pull request includes a Start TDVE field, an End TDVE field and a Message Header field which provide routing data to the pulling node. BCB 160's pointer points to an area in buffer memory where OCB 162 is stored and, more particularly, to where the Start TDVE field begins therein. This assures that the message portion of the pull request is inserted into OCB 162 at the point where the Start TDVE field is located. The remainder of the pull request is also stored directly following the Start TDVE field within OCB 162 (including destination data identifying the pulling node).

For information requests that are not of the pull variety, a requesting node sends a message to the source node requesting a transfer of data from the source node. The source node institutes an interrupt and commences a software-controlled operation to find the requested data and to insert the necessary TDVE values into an OCB which controls the message dispatch action. As above indicated, this interrupt/software controlled operation is avoided in a pull request by the direct insertion into OCB 162 of the message identity and routing data, directly from the pull request.

Once a pull message has been stored within the buffer area allocated to OCB 162, pulled node 122 is ready to commence transmission. Microprocessor 164 accesses output registers 180 wherein the address of OPTE 166 is found. OPTE 166 enables the fetching of OCB 162. The Start and End TDVE values found in OCB 162 define the range of data to be transmitted from within data buffer 174. Recall that these fields were originally sent by pulling node 120 as part of its pull request and were written into this specific location under control of BCB 160 when the pull request was received. Also, the message header portion contained within OCB 162 is that received from pulling node 120 and was written at the same time as the Start and End TDVE values.

The values within OCB 162 are then serially accessed to enable assembly of the message to be transmitted. Note that while only one TDVE control block 168 is shown, other TDVE control blocks could also be chained therefrom to enable assembly of a larger message, depending on the End TDVE value stored in OCB 162. Thereafter, the requisite BCBs are accessed to enable identification of the areas within data buffer 174 containing the requested data.

The actual transmission action is handled under control of memory interface 152 and a ready queue 182. When a particular OPTE moves to the top of Ready Queue 182, the message data is assembled, as aforesaid, and transmitted through communication network 126 to pulling node 120. Upon receipt, pulling node 120 stores the received data in accordance with its input control block chain.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A computing system including multiple nodes said system comprising:

a communication network;

a first node connected to said communication network and including means for transmitting an information transfer request that includes identification data usable by a node to access requested information and further data identifying a destination for said requested information; and a second node connected to said communication network for receiving said information transfer request, said second node including a memory for storing said requested information, a processor and a message output control data structure, said second node also including a processor that is responsive to identification data contained in said message output control data structure to access information from said memory, said processor further responsive to receipt of said information transfer request from said first node to insert said identification data contained in said information transfer request from said first node into said message output control data structure, said second node initiating an output operation, without performing an interrupt of said processor, by employing said message output control data structure and pointers to required data as included with said information transfer request from said first node, to access said requested information from said memory and to communicate said requested information to said destination.

2. The computing system as recited in claim 1, wherein said further data in said information transfer request is routing data required to enable a message to be transferred from said second node to said destination, said routing information also inserted into said message output control data structure by said second node, whereby said second node is enabled to immediately access said routing data with said identification data.

3. The computing system as recited in claim 1 wherein said second node commences said output operation upon receipt of said information transfer request and performs the output operation without requiring an interrupt action by said processor.

4. The computing system as recited in claim 1, wherein said further data identifies said first node as said destination.

5. The computing system as recited in claim 1, wherein said further data identifies a third node as said destination.

6. A method for message transfer in a computing system including first and second nodes and a communication network, said method comprising the steps of:

(a) transmitting an information transfer request from said first node to said second node, said information transfer request including pointer data directly usable by said second node to access requested information stored in said second node and further data designating a destination for said requested information;

(b) receiving said information transfer request at said second mode and creating and storing a message output control data structure to enable assembly of requested information;

(c) responding at said second node to receipt of said information transfer request from said first node to directly insert at least said further data and pointer data contained in said information transfer request into said message output control data structure; and (d) initiating an output operation at said second node by employing said message output control data structure and included further data and pointer data to access said stored requested information and to communicate said requested information to said destination.

7. The method as recited in claim 6, wherein said further data in said information transfer request includes routing data required to enable a message to be transferred from said second node to said destination, said responding step (c) causing insertion of said routing information into said message output control data structure, whereby said second node is enabled to immediately access said routing data with said identification data.

8. The method as recited in claim 6 wherein said initiating step (d) commences upon receipt of said information transfer request and performs the output operation without requiring a processor interrupt action in said second node.

* * * * *